(12) United States Patent
Wolf et al.

(10) Patent No.: US 6,351,043 B1
(45) Date of Patent: Feb. 26, 2002

(54) DYNAMICALLY BALANCED SMALL ELECTRIC MOTOR

(75) Inventors: Peter Wolf, Luzern; Arnold Teimel, Sachseln, both of (CH)

(73) Assignee: Interelectric AG, Sachseln (CH)

( * ) Notice: Subject to any disclaimer, the term of this patent is extended or adjusted under 35 U.S.C. 154(b) by 0 days.

(21) Appl. No.: 09/599,282

(22) Filed: Jun. 22, 2000

(30) Foreign Application Priority Data

Jul. 2, 1999 (DE) .......................... 199 30 602

(51) Int. Cl.[7] .............................. H02K 15/16
(52) U.S. Cl. ......................... 310/51; 310/261
(58) Field of Search .................... 310/51, 261

(56) References Cited

U.S. PATENT DOCUMENTS 4,893,044 A * 1/1990 Bush et al. ............... 310/261
4,900,237 A * 2/1990 Reedy ....................... 417/356
5,367,909 A * 11/1994 Heilman et al. ........... 310/51
5,481,142 A * 1/1996 James et al. ............... 310/51
5,959,383 A * 9/1999 Winzen et al. ............ 310/90.5

FOREIGN PATENT DOCUMENTS

| DE | 880508 | 6/1953 | |
| DE | 1613291 | 1/1971 | |
| DE | 442185 | 1/1996 | ............ B06H/1/00 |

* cited by examiner

*Primary Examiner*—Burton S. Mullins
(74) *Attorney, Agent, or Firm*—Marshall, Gerstein, & Borun

(57) ABSTRACT

A small electric motor comprising a stator, a rotor with a rotor shaft, and a projecting shaft end of the rotor shaft which has arranged thereon an element to be driven, so as to be of a vibration-low construction. The other shaft end of the rotor shaft is also designed as a projecting shaft end and a balancer is arranged on said other shaft end with an arrangement and mass or weight distribution that are predetermined for the dynamic balancing of the element to be driven.

10 Claims, 3 Drawing Sheets

DYNAMICALLY BALANCED SMALL ELECTRIC MOTOR

FIELD OF THE INVENTION

The present invention relates to a small electric motor comprising a stator, a rotor with a rotor shaft and a projecting shaft end of the rotor shaft which has arranged thereon an element to be driven. The invention also relates to a method for dynamically balancing such an electric motor.

BACKGROUND OF THE INVENTION

In particular with applications where relatively large components are to be rotated by small electric motors, vibrations might arise that are disadvantageous for specific uses. Such problems will in particular arise when the components are directly arranged on the rotor shaft of the motor and are made relatively flat, but have a large diameter often exceeding the diameter of the motor. Such components may e.g. be fan impellers, filter discs or any type of component to be driven by an electric motor. As for such components that are large in comparison with the constructional size of the electric motor and are only seated on a small portion of the rotor shaft, axial runouts play a very great role in the generation of undesired vibrations. Another drawback inherent to most applications is that the rotational speeds produced by small electric motors are often very high, whereby the vibrations are further increased. Flat type motors are used for some applications for reasons of space, as a consequence of which the rotor cannot be balanced because of its small length.

SUMMARY OF THE INVENTION

It is now the object of the present invention to provide a small electric motor of the above-mentioned type with a low-vibration running.

According to the invention this object is achieved in that the other shaft end of the rotor shaft is also designed as a projecting shaft end and a balancer is arranged on said other shaft end with an arrangement and mass or weight distribution predetermined for dynamically balancing the element to be driven. In all of the known cases in which drivable elements of a relatively large size and most of the time of a considerable mass or weight in comparison with the motor are to be moved by small electric motors, a shaft end for the arrangement of said element only projects at one side. It now seems to be a very unusual measure that at the other side of the electric motor that has so far had no function assigned to it in such types of motors and has normally been closed by an end shield, a projecting shaft end is now arranged for mounting a balancer thereon. Often, the confined installation space only plays a role at the side at which the element to be driven, for instance a fan impeller, a filter plate, or the like, is arranged. At the other side the confined installation space is often of secondary importance so that the balancer can also be given a very large size and equipped with an adequate mass or weight. This permits an excellent dynamic balancing operation. Apart from a low-noise or low-vibration running, the load on the bearings is also reduced, which in turn will increase the service lives thereof. The balancer can be designed such that it is suited for the mounting of additional weights or masses and also for the removal of parts thereof. With such a measure it is inter alia possible to further increase the considerable mass or weight of the elements to be driven. Moreover, an axial runout of the rotor or of the element which is to be driven and arranged on the rotor and which leads to a dynamic unbalance (gyroscopic moment) can very well be compensated for by balancing in a second plane at a certain axial distance. The axial runout had to be kept very small in formerly used elements to be driven. This entailed high demands on the manufacture of said members and on the mounting device. High manufacturing costs were the result thereof. Thanks to the use of the balancer the demand made as to axial runout tolerance need not be so high, whereby the manufacturing and mounting costs of the element to be driven can also be reduced. The projecting shaft end is here in particular meant to be a shaft end extended beyond the bearing point.

One variant of the invention has a particularly advantageous effect in that the element to be driven is a disc-like body whose diameter is larger than the diameter of the rotor or the stator. In such disc-like bodies, the surface getting into contact with the rotor shaft is relatively small so that axial runouts might also be produced during mounting operations, e.g. gluing, pressing or similar installation possibilities, on the rotor shaft. A dynamic balancing operation by means of a balancer of a suitable size is excellently suited for such thin large-diameter elements to be driven.

The above advantages are in particular enhanced in variants in which the stator and the rotor are made flat. Such constructions, which are designated as flat type motors (pancake motors, cup motors), have so far not offered any possibility of using balancers, no matter of what type. The otherwise closed back side of such motors is now penetrated according to the invention by a projecting shaft end for mounting the balancer.

To observe axial installation lengths that are as small as possible at the side of the balancer, the balancer may preferably have the shape of a disc. In disc-like balancers a satisfactory result can readily be achieved by slightly changing the arrangement and mass or weight distribution.

Advantageously, the balancer may be made from a material having a high specific weight, such as brass, steel or copper, and the targeted mass or weight distribution may be effected by means of recesses, produced in particular by machining. This means, for instance, that a simple sleeve can be anchored to the rotor shaft and is then provided at specific points with recesses or with a single recess in accordance with the desired balancing operation. The location for the recess can rapidly be detected by means of suitable machines which could then form or incorporate the recess at the same time.

However, it is also possible to design the balancer as a carrier element in or on which the balancing weights can be arranged and/or mounted. The balancing weights can be mounted variably on the carrier element with respect to their quantity and also their place. The balancing weights can be graduated to a very fine degree, so that corresponding results can be achieved with a satisfactory accuracy.

For instance at least one paste with a suitable specific weight can be used as the balancing weight. For instance, if the carrier element is designed as a hollow body with various receiving chambers, targeted balancing results can be achieved by introducing predetermined pastes with a respectively suited specific weight. The composition of the paste will then follow from the necessary mass or weight. Additives, such as metal powder, may be contained.

However, it is also possible that the balancing weight comprises metal balls. These may also be arranged in a paste. Metal balls can be produced with different diameters and have a specific weight in accordance with material and size. Furthermore, they can be pre-positioned on the carrier element and displaced by suitable means for adjusting purposes so that sometimes the mass or weight has just to be displaced and need not be added or removed.

In a particularly advantageous development a housing may be provided, the shaft ends may respectively project from the housing and the element to be driven or the balancer may be arranged outside the housing. As for the construction of such a small electric motor, attention has just to be paid that a shaft stub on which the balancer can be arranged is projecting at the other end. Additional measures are not needed, so that the otherwise compact constructional shape of the motors can be maintained.

Although the most different mounting bodies can be used as elements to be driven, said body is formed by a fan impeller according to one embodiment. The use of fan impellers is wide-spread and their applications are numerous. It is now possible to operate relatively large fan impellers by relatively small motors without any objectionable effects caused by vibrations.

However, it is also possible to use an optical filter disc as the element to be driven. Such filter discs often consist of different materials arranged as a composite system, so that an unbalance or axial runout must always be expected because of the type of production. Such an unbalance or axial runout can be sufficiently compensated by the balancer, so that even high speeds can be employed.

Furthermore, the present invention relates to a method for the dynamic balancing of small electric motors. The method is meant to allow for a simple balancing of rotor shafts with relatively large elements to be driven without any need for a disadvantageous interference with the construction of the small electric motor. To this end a balancing element is arranged on another projecting shaft end of the rotor shaft that is axially spaced from the shaft end comprising the element to be driven, and a dynamic balancing of the entire rotor is performed by removing or mounting or displacing at least one balancing weight on the balancing element. This means that balancing can respectively be carried out beyond or outside the bearing point or points on the projecting end portions of the rotor shaft.

Preferably, the dynamic balancing operation is carried out with the rotor being arranged inside the stator. The small electric motor is thus completely mounted, including the element to be driven, so that there are numerous possibilities of mounting and designing balancers (also several balancers at the same time) by a sliding movement onto the opposite projecting shaft end. The dynamic balancing operation is thereby simplified enormously. With the aid of modern balancing machines one can very rapidly determine where and with which weight distribution the balancer is to be arranged on the shaft end.

Advantageously, the at least one balancing weight can be removed by removing material on the balancing element. In such a case it would be possible to press or glue a metal sleeve, e.g. of steel, onto the projecting shaft end and following a subsequent unbalance determining operation a recess is incorporated at a specific place by drilling, milling or other machining or eroding operations, etc.

BRIEF DESCRIPTION OF THE DRAWINGS

Embodiments of the present invention shall now be described in more detail with reference to a drawing in which.

DETAILED DESCRIPTION OF THE PREFERRED EMBODIMENT

Figure 1:
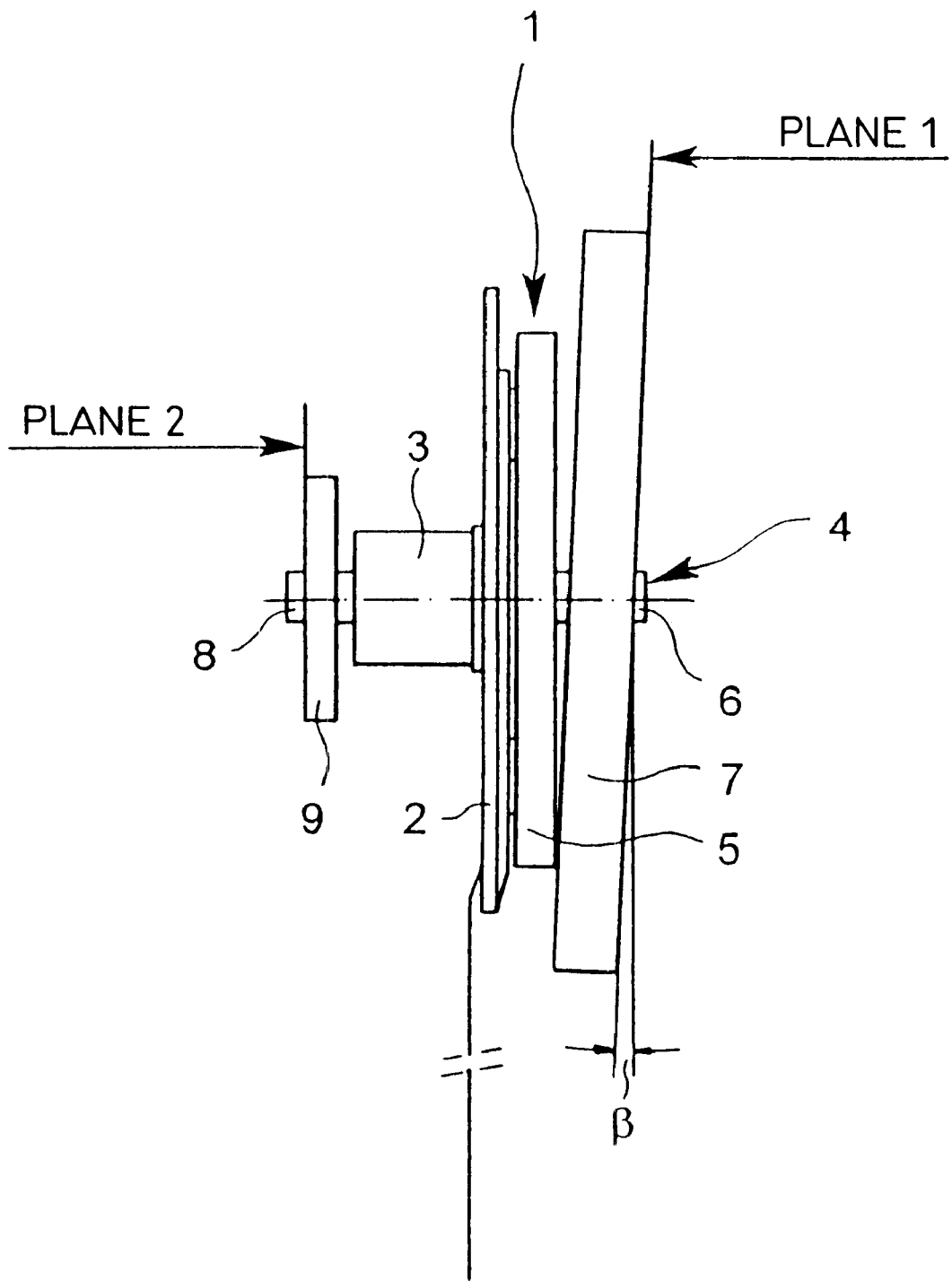
FIG. 1 is a schematic side view showing a flat type motor with balancer and disc body to be driven.

The small electric motor shown in FIG. 1 comprises a rotor 1 which is designed as an external rotor, a stator, a bearing housing 3 arranged on the stator 2, and a rotor shaft 4. In this instance the motor is constructed as a flat type motor because the electric drive member with the rotor disc 5 and the stator 2 has a relatively small axial length. The rotor disc 5 comprises a permanent magnet ring, which is not shown in more detail. The stator 2 has arranged thereon coils which are assigned to the inside of the magnet ring and which are excited with a controlled direct current via an electronic motor system.

The rotor disc 5 is firmly seated on the rotor shaft 4 which extends through the bearing housing 3 and is there preferably supported in two spaced-apart roller bearings. The rotor shaft 4 comprises a first projecting end portion 6 which serves the arrangement of a disc-like additional element 7. Said additional element 7 may represent the most different components, e.g. fan impellers, filter discs, or the like. The invention, however, is not necessarily restricted to one of said constructions because a dynamic balancing operation can be carried out independently of the type of the individual additional element 7. Preferably, the additional element 7 is pressed onto the first end portion 6.

A second end portion 8 of the rotor shaft 4 that has a disc-like balancer 9 arranged thereon projects from the bearing housing 3 at the opposite side.

The additional element 7 is a relatively large component of considerable mass or weight in comparison with the small electric motor, so that a balancing operation is imperative. So far such elements have only been balanced statically, which as a rule has been carried out on the additional elements themselves. As can be seen in FIG. 1, the additional element 7 may also have an axial runout which is drawn in an exaggerated manner by way of the angle β. Although an additional element 7 mounted in this way can be balanced statically in a very easy manner, relatively high rotational speeds will also cause loads as to a gyroscopic moment, possibly resulting in vibrations. To compensate for such loads, the balancer 9 is mounted on the shaft end 8.

The operation and function of the invention shall now be explained in more detail with reference to the above embodiment.

Figure 3:
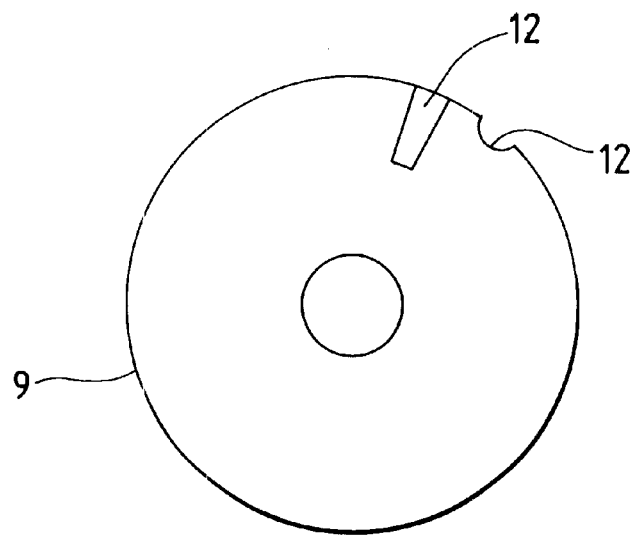
FIG. 3 is a side elevation view showing the balancer of FIG. 1.
Figure 4:
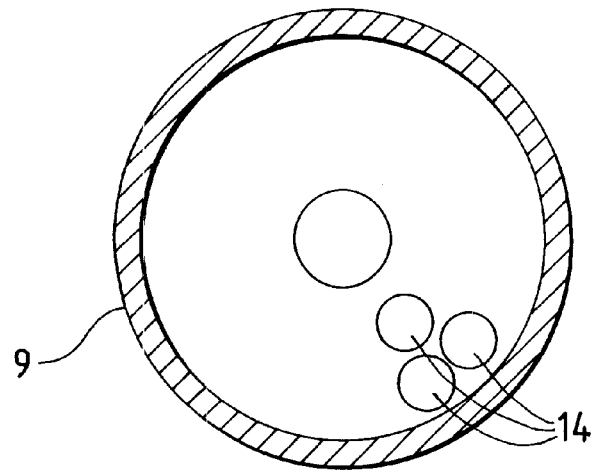
FIG. 4 is a side elevation view, in section, of an alternative balancer.

As far as dynamic balancing is concerned, it is important that the balancer 9 and the additional element 7 are arranged on the same rotor shaft 5 in axially spaced-apart relationship so that two masses or weights are arranged in different planes. The additional element 7 is arranged in plane 1 and the balancer 9 is in plane 2. The balancer 9 has a smaller diameter than the rotor 1 and the additional element 7 and consists of a material having a relatively high specific weight. In the instant case a steel disc is used as a balancer 9 which is pressed onto the shaft end 8. After a static balancing operation has been carried out, a dynamic balancing operation will now take place. A dynamic balancing operation is preferably performed in that recesses 12 (FIG. 3) are incorporated into the balancer 9 at points that have exactly been determined by corresponding means, resulting in an uneven mass or weight distribution or arrangement on the balancer 9. Said uneven weight arrangement is of the type that it dynamically compensates for the axial runout of the additional element 7. The removal of material on the balancer 9 or the incorporation of recesses can be performed by way of milling or similar machining or abrading processes. Weight or mass compensation during balancing can be carried out at the front side and also on the circumference of the balancer. In the alternative embodiment shown in FIG. 4, balancing weights, such as balancing balls 14, are attached to the balancer 9 to create the uneven weight arrangement. The balancing balls 14 may be attached to the balancer 9 using any suitable means, such as a paste.

As can further be seen, the two weights of elements 7 and 9 that are to be compensated with respect to one another are each located on the extreme outside of the rotor shaft 4, and the real drive portion of the motor is arranged between said two elements. The balancer 9 may have a relatively large size on account of the use of the projecting end portion 8, resulting in excellent balancing characteristics. If a sufficiently large weight has been chosen for the balancer 9, static balancing at the beginning can also be dispensed with.

A second embodiment of the invention shall now be explained in more detail with reference to FIG. 2.

If there are identical components or components having an identical effect, reference will be made to the above description with the same reference numerals. The decisive differences shall only be discussed in the following.

Figure 2:
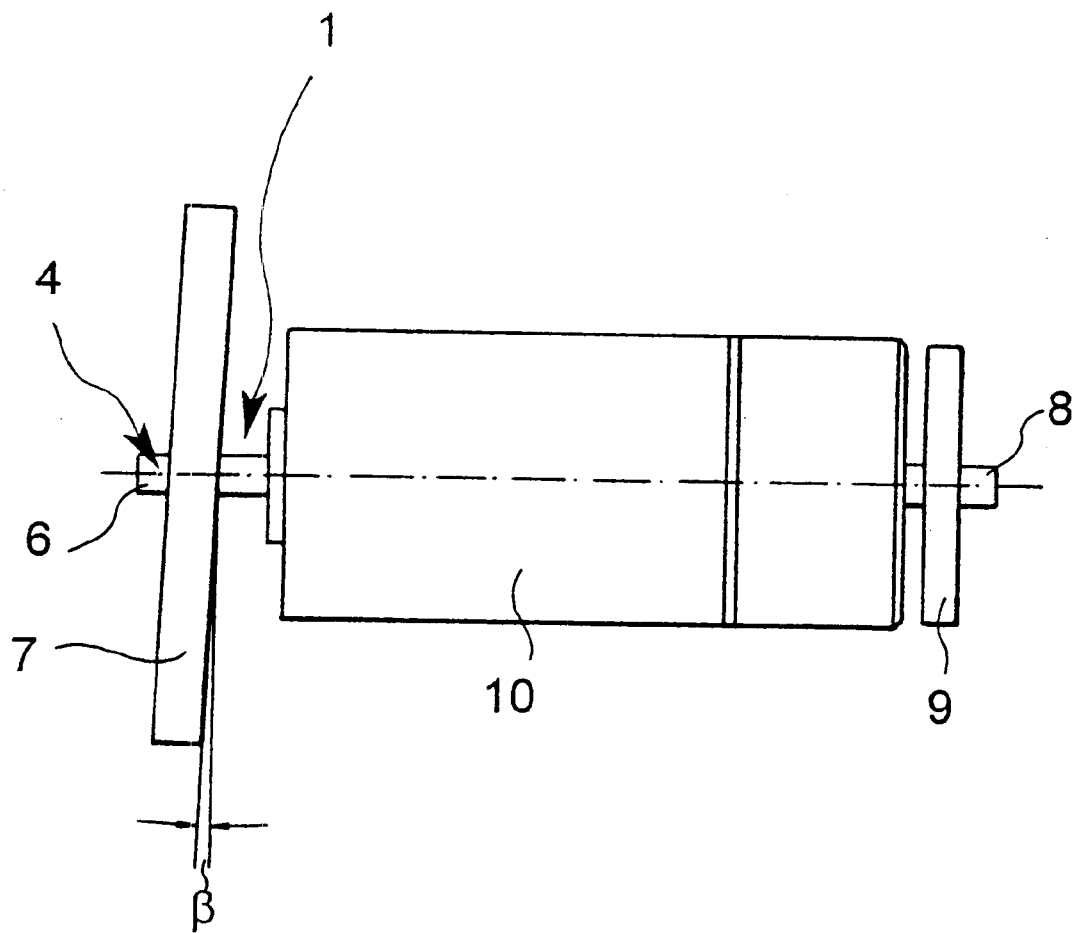
FIG. 2 is a schematic side view showing a conventional small motor with balancer and disc body to be driven.

The small electric motor shown in FIG. 2 is a rotor 1 which is surrounded by a stationary stator housing 10 and comprises an internal rotor (not shown in more detail). The motor may be a brushless d.c. motor or a bell-type armature motor. In this embodiment the rotor shaft projects over both sides of the stator housing 10 and the additional element 7, e.g. a fan impeller, is arranged at one side and the disc-like balancer 9 at the other side. In this instance, a dynamic balancing operation is also performed by incorporating recesses, in particular for compensating for the axial runout β of the additional element 7. Thanks to such a construction excessively high manufacturing demands need no longer be made on the additional elements 7 because these can be produced with less precise dimensions and mounted on the shaft end 6. The production costs are thereby reduced to a very considerable extent. Although the balancer 9 occupies relatively little space, vibrations during operation are reduced to a very great extent thanks to the positive effect thereof. This will also be noticed in a positive manner, in particular with respect to the service life of the bearings and with respect to noise development, said features being sometimes a very decisive factor in the purchasing of a specific product in which such a small electric motor is installed.

The advantage of this solution is however that the electric drive portion of the small electric motor need not be changed for achieving said positive characteristics. What is only required is a longer shaft and an end shield with an opening. Effects on the winding and the magnetic system are predominantly ruled out.

The balancer 9 as shown in the drawings is meant to be representative of all other possible embodiments, such as a carrier element with additional variable mass or weight parts.

What is claimed is:

1. A small electric motor comprising in combination a stator (2), a rotor (1) with a rotor shaft (4), a projecting shaft end (6) of said rotor shaft (4) which has arranged thereon an element (7) to be driven, another shaft end (8) of said rotor shaft (4) designed as a projecting shaft end, and a balancer (9) arranged on said other shaft end (8) with an arrangement and mass or weight distribution that are predetermined for the dynamic balancing of said element (7) to be drive, wherein said element (7) to be driven is a disc-like body whose diameter is larger than the diameter of said rotor (1) or said stator (2).

2. The small electric motor according to claim 1, wherein said balancer (9) is made from a material having a high specific weight and a targeted mass or weight distribution is achieved by means of recesses produced therein, and wherein said means of recesses are produced by a machining process.

3. A small electric motor comprising in combination a stator (2), a rotor (1) with a rotor shaft (4), a projecting shaft end (6) of said rotor shaft (4) which has arranged thereon an element (7) to be driven, another shaft end (8) of said rotor shaft (4) designed as a projecting shaft end, and a balancer (9) arranged on said other shaft end (8) with an arrangement and mass or weight distribution that are predetermined for the dynamic balancing of said element (7) to be drive, wherein said stator (2) and said rotor (1) are of a flat type construction.

4. A small electric motor comprising in combination a stator (2), a rotor (1) with a rotor shaft (4), a projecting shaft end (6) of said rotor shaft (4) which has arranged thereon an element (7) to be driven, another shaft end (8) of said rotor shaft (4) designed as a projecting shaft end, and a balancer (9) arranged on said other shaft end (8) with an arrangement and mass or weight distribution that are predetermined for the dynamic balancing of said element (7) to be drive, wherein said balancer (9) has the shape of a disc.

5. A small electric motor comprising in combination a stator (2), a rotor (1) with a rotor shaft (4), a projecting shaft end (6) of said rotor shaft (4) which has arranged thereon an element (7) to be driven, another shaft end (8) of said rotor shaft (4) designed as a projecting shaft end, and a balancer (9) arranged on said other shaft end (8) with an arrangement and mass or weight distribution that are predetermined for the dynamic balancing of said element (7) to be drive, wherein said balancer (9) is designed as a carrier element in or on which balancing weights are arranged or can be mounted.

6. The small electric motor according to claim 5, wherein said balancing weight is formed by at least one paste having a suitable specific weight.

7. The small electric motor according to claim 5 or 6, wherein said balancing weight comprises metal balls.

8. A method for dynamically balancing small electric motors of the type having a stator (2), a rotor (1) with a rotor shaft (4), and a projecting shaft end (6) of the rotor shaft (4) with an element (7) to be driven arranged thereon, comprising the steps of providing another projecting shaft end (8) of said rotor shaft (4), said other shaft end (8) being axially spaced apart from said shaft end (6) including said element (7) to be driven, arranging a balancer (9) on said other projecting shaft end (8), said balancer having at least one balancing mass or weight arranged thereon, and dynamically balancing said whole rotor by removing or mounting or displacing said at least one balancing mass or weight on said balancer (9).

9. The method according to claim 8, wherein said step of dynamic balancing is carried out while said rotor (1) is arranged inside said stator (2).

10. The method according to claim 9, wherein said step of removing said at least one balancing mass or weight is performed by abrading material on said balancer (9).

* * * * *

UNITED STATES PATENT AND TRADEMARK OFFICE
CERTIFICATE OF CORRECTION

PATENT NO.     : 6,351,043 B1
DATED          : February 26, 2002
INVENTOR(S)    : Peter Wolf and Arnold Teimel It is certified that error appears in the above-identified patent and that said Letters Patent is hereby corrected as shown below:

<u>Column 6,</u>
Lines 3, 19, 29 and 38, "drive" should be -- driven --.

Signed and Sealed this

Ninth Day of July, 2002

*Attest:*

*Attesting Officer*

JAMES E. ROGAN
*Director of the United States Patent and Trademark Office*